United States Patent
Griffin et al.

(10) Patent No.: US 11,693,694 B2
(45) Date of Patent: Jul. 4, 2023

(54) MIGRATING QUANTUM SERVICES FROM QUANTUM COMPUTING DEVICES TO QUANTUM SIMULATORS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 151 days.

(21) Appl. No.: 17/215,996

(22) Filed: Mar. 29, 2021

(65) Prior Publication Data

US 2022/0308916 A1    Sep. 29, 2022

(51) Int. Cl.
*G06F 9/48*      (2006.01)
*G06N 10/00*    (2022.01)
*G06F 9/455*    (2018.01)

(52) U.S. Cl.
CPC ............ *G06F 9/4856* (2013.01); *G06F 9/455* (2013.01); *G06N 10/00* (2019.01)

(58) Field of Classification Search
CPC .................................................. G06F 9/4856
See application file for complete search history.

(56) References Cited

U.S. PATENT DOCUMENTS

| | | | |
|---|---|---|---|
| 10,176,276 B2 | 1/2019 | Chao et al. | |
| 10,303,573 B2 | 5/2019 | Basham et al. | |
| 10,698,789 B1 | 6/2020 | Liu et al. | |
| 10,776,225 B2 | 9/2020 | Xu et al. | |
| 2020/0074346 A1 | 3/2020 | Griffin et al. | |
| 2020/0117764 A1 | 4/2020 | Zuccarelli et al. | |
| 2020/0218518 A1* | 7/2020 | Gambetta | ............... G06F 8/41 |

FOREIGN PATENT DOCUMENTS

| | | |
|---|---|---|
| CN | 109302288 A | 2/2019 |
| CN | 107179957 B | 8/2020 |

* cited by examiner

*Primary Examiner* — Charlie Sun
(74) *Attorney, Agent, or Firm* — Dority & Manning, P.A.

(57) ABSTRACT

Migration of quantum services from quantum computing devices to quantum simulators is disclosed herein. In one example, a quantum computing device executes a migration service that receives a system stress indicator from a system monitor that tracks a status of the quantum computing device and/or a status of qubits maintained by the quantum computing device. The migration service determines, based on the system stress indicator, that a quantum service running on the quantum computing device is to be migrated. Upon determining that the quantum service is to be migrated, the migration service retrieves a QASM file that contains quantum programming instructions defining the quantum service. The QASM file is then transmitted to a quantum simulator running on a classical computing device for failover execution. In some examples, the classical computing device then executes a simulated quantum service within the quantum simulator based on the QASM file.

20 Claims, 7 Drawing Sheets

MIGRATING QUANTUM SERVICES FROM QUANTUM COMPUTING DEVICES TO QUANTUM SIMULATORS

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to react to adverse operating conditions that may jeopardize the availability of a quantum service executing on a quantum computing device will be desirable.

SUMMARY

The examples disclosed herein implement migration from a quantum computing device to quantum simulators, e.g., for disaster recovery in the event a quantum computing device encounters operating conditions that threaten the stability or availability of a quantum service executing thereon. In this manner, continuity of the functionality of the quantum service may be maintained for clients of the quantum service should the quantum computing device or the quantum service become unavailable.

In one example, a method for migrating quantum services from quantum computing devices to quantum simulators is provided. The method comprises receiving, by a migration service of a quantum computing device, a system stress indicator for the quantum computing device from a system monitor. The method further comprises determining, based on the system stress indicator, that a quantum service running on the quantum computing device is to be migrated. The method also comprises retrieving a Quantum Assembly Language (QASM) file containing quantum programming instructions defining the quantum service. The method additionally comprises transmitting the QASM file to a quantum simulator running on a classical computing device for failover execution.

In another example, a computing system for migrating quantum services from quantum computing devices to quantum simulators is provided. The computing system comprises a quantum computing device comprising a first system memory and a first processor device coupled to the first system memory. The first processor device is to receive, using a migration service, a system stress indicator for the quantum computing device from a system monitor. The first processor device is further to determine, based on the system stress indicator, that a quantum service running on the quantum computing device is to be migrated. The first processor device is also to retrieve a QASM file containing quantum programming instructions defining the quantum service. The first processor device is additionally to transmit the QASM file to a quantum simulator running on a classical computing device for failover execution.

In another example, a non-transitory computer-readable medium is provided. The non-transitory computer-readable medium stores thereon computer-executable instructions that, when executed, cause the one or more processor devices to receive a system stress indicator for a quantum computing device from a system monitor. The computer-executable instructions further cause the one or more processor devices to determine, based on the system stress indicator, that a quantum service running on the quantum computing device is to be migrated. The computer-executable instructions also cause the one or more processor devices to retrieve a QASM file containing quantum programming instructions defining the quantum service. The computer-executable instructions additionally cause the one or more processor devices to transmit the QASM file to a quantum simulator running on a classical computing device for failover execution.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
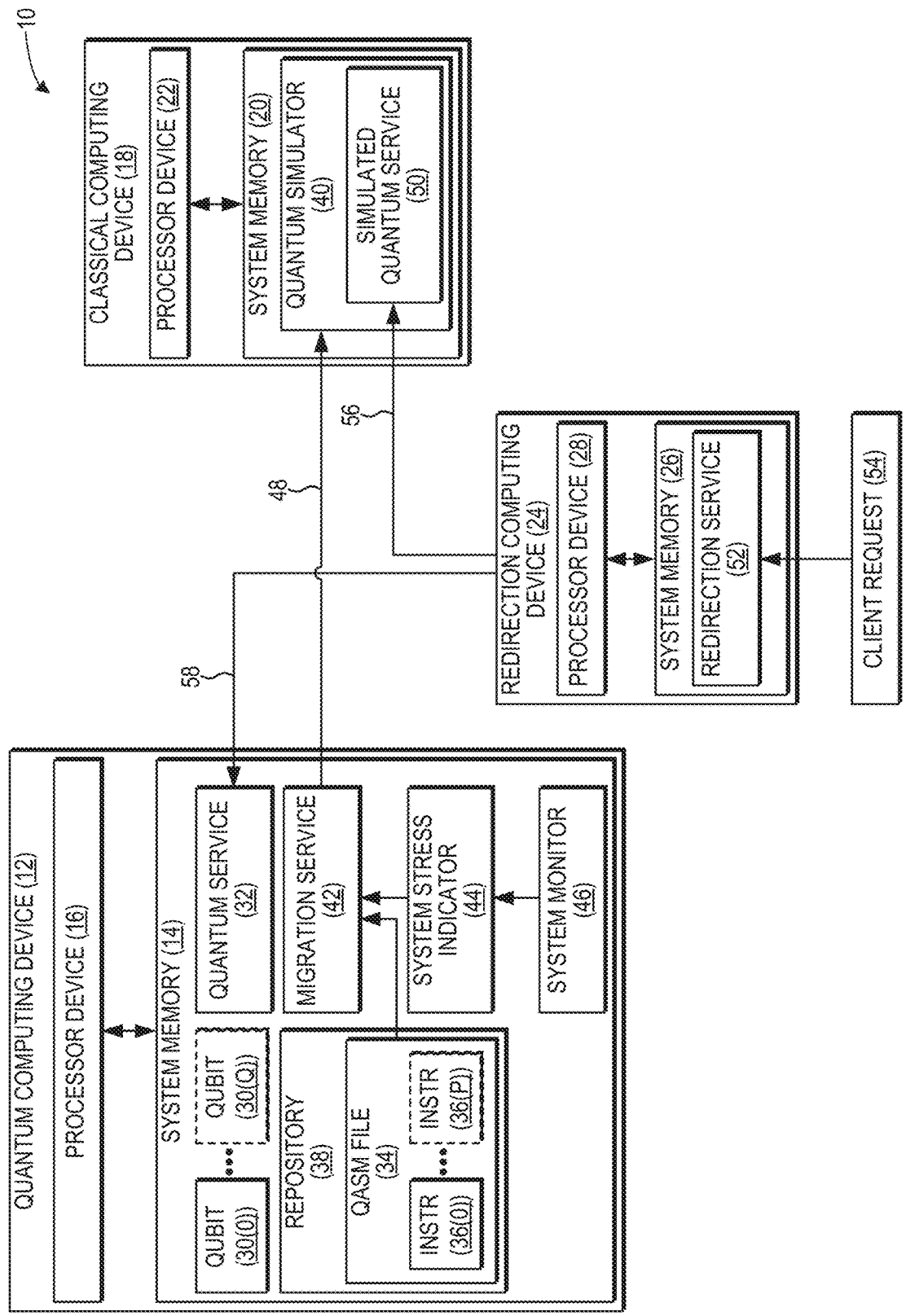
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first client request" and "second client request," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, quantum computing involves the use of quantum bits, referred to herein as "qubits," each of which has properties (such that superposition and entanglement) that differ from those of classical (i.e., non-quantum) bits used in classical computing. Quantum computing devices generally have stricter requirements in terms of their operating environment than classical (i.e., non-quantum) computing devices. For instance, the operating environment of a quantum computing device may require that a specific temperature range be maintained to ensure coherence of qubits used for quantum operations. Thus, as quantum computing continues to increase in popularity and become more commonplace, an ability to react to adverse operating conditions that may jeopardize a quantum computing device's ability to maintain qubits will be desirable.

The examples disclosed herein implement migration of quantum services from quantum computing devices to quantum simulators, e.g., in response to a deterioration of operating conditions in which the quantum computing devices operate. As used here, the term "quantum service" and derivatives thereof refer to a process that executes on a quantum computing device, that is defined by quantum programming instructions provided in a Quantum Assembly Language (QASM) file, and that accesses one or more qubits to provide a desired functionality. In some examples, a quantum computing device executes a migration service that receives a system stress indicator from a system monitor that tracks a status of the quantum computing device and/or a status of qubits maintained by the quantum computing device. The system stress indicator may include, as non-limiting examples, an indication of a state of the quantum computing device itself (e.g., system load, system response time, operating temperature, and/or the like), an indication of a state of the qubits maintained by the quantum computing device (e.g., qubit age, coherence time, and/or the like), and/or an indication of any other condition that may adversely affect the ability of the quantum computing device to maintain its qubits in a usable state.

The migration service determines, based on the system stress indicator, that a quantum service running on the quantum computing device is to be migrated. As a non-limiting example, the migration service may make the determination by comparing the system stress indicator with a corresponding operating threshold or parameter. Thus, for instance, the system stress indicator may comprise a current operating temperature of the quantum computing device, which may be compared to a temperature parameter that indicates an acceptable operating temperature for the quantum computing device to determine whether the current operating temperature exceeds the acceptable operating temperature.

Upon determining that the quantum service is to be migrated, the migration service retrieves a QASM file that contains quantum programming instructions defining the quantum service. The QASM file is then transmitted to a quantum simulator running on a classical computing device for failover execution. In some examples, the quantum simulator may comprise a Qiskit quantum computing framework. Some examples may provide that the quantum simulator, upon receiving the QASM file, executes a simulated quantum service, corresponding to the functionality provided by the quantum service running on the quantum computing device, based on the QASM file. According to some examples, a redirection computing device may also be provided for receiving client requests directed to the quantum service and for determining whether the quantum service is still operational on the quantum computing device. If the quantum service is not operational, the redirection computing device, in such examples, forwards the client request to the simulated quantum service. However, if the quantum service is operational (i.e., if operating conditions have returned to acceptable parameters or the quantum service has been successfully restarted), the redirection computing device forwards the client request to the quantum service.

FIG. 1 is a block diagram of a computing system 10 according to one example. The computing system 10 includes a quantum computing device 12, which comprises a first system memory 14 and a first processor device 16, and also includes a classical computing device 18, which comprises a second system memory 20 and a second processor device 22. The computing system 10 in the example of FIG. 1 also includes a redirection computing device 24, which is a classical computing device comprising a third system memory 26 and a third processor device 28. The quantum computing device 12, the classical computing device 18, and the redirection computing device 24 are all communicatively coupled via a classical communications link (not shown), which may comprise a private network or a public network such as the internet. It is to be understood that the computing system 10, according to some examples, may include other classical computing devices and/or quantum computing devices that are not illustrated in FIG. 1. Additionally, the quantum computing device 12, the classical computing device 18, and/or the redirection computing device 24 in some examples may include constituent elements in addition to those illustrated in FIG. 1.

The quantum computing device 12 operates in quantum environments but can operate using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 maintains a set of one or more qubits 30(0)-30(Q) that may be employed for quantum operations or computations. The quantum computing device 12 also executes a quantum service 32, which employs one or more of the qubits 30(0)-30(Q). The quantum service 32 is defined using a QASM file 34, which comprises one or more quantum programming instructions (captioned "INSTR" in FIG. 1) 36(0)-36(P). QASM is a programming language that specifies quantum circuits as input to a quantum computer by declaring classical bits and qubits and describing operations on the qubits and measurements needed to obtain a classical result based on the qubits. As seen in FIG. 1, the QASM file 34 is stored in a repository 38, which may comprise a database or a file system on a persistent data store, as non-limiting examples.

The classical computing device 18 executes a conventional quantum simulator 40, which in some examples may comprise a Qiskit quantum computing framework, which is an open-source framework that provides tools for creating and manipulating quantum programs and simulating execution of the quantum programs on classical computing devices. The quantum simulator 40 is capable of taking as input a QASM file such as the QASM file 34, and simulating quantum operations or computations in a manner that may recreate the functionality of a quantum service such as the quantum service 32.

One function provided by the computing system 10 of FIG. 1 is automatic migration of quantum services, such as the quantum service 32, if the quantum computing device 12 and/or the qubit(s) 30(0)-30(Q) themselves exhibit signs of stress indicating that the quantum computing device 12 may lose the ability to effectively maintain the qubit(s) 30(0)-30(Q). For instance, in one possible use case, an organization making use of the quantum computing device 12 may seek to automatically migrate the quantum service 32 as part of a disaster recovery plan. Accordingly, in the example of FIG. 1, the quantum computing device 12 implements a migration service 42 that provides functionality for automatically migrating the quantum service 32. The migration service 42 is executed by the first processor device 16 and receives a system stress indicator 44 from a system monitor 46 of the quantum computing device 12. The system monitor 46 tracks a status of the quantum computing device 12 and/or a status of the qubit(s) 30(0)-30(Q) maintained by the quantum computing device 12. In some examples, the system monitor 46 comprises a process executed by the first processor device 16, while some examples may provide that the system monitor 46 represents a sensor or other hardware that provides data to the first processor device 16. It is to be understood that, while the system monitor 46 is illustrated in FIG. 1 as an integral element of the quantum computing device 12, some examples may provide the system monitor 46 as an element separate from and/or external to the quantum computing device 12.

The system stress indicator 44 may comprise an indication of any operating or environmental condition that may affect the ability of the quantum computing device 12 to maintain the qubit(s) 30(0)-30(Q) in a usable state. Thus, according to some examples, the system stress indicator 44 may include an indication of a state of the quantum computing device 12 itself, such as a system load indication, a system response time indication, an operating temperature indication, and/or the like, as non-limiting examples. Some examples may provide that the system stress indicator 44 comprises an indication of a state of the qubit(s) 30(0)-30(Q) maintained by the quantum computing device 12, such as a qubit age indication, a coherence time indication, and/or the like, as non-limiting examples.

Upon receiving the system stress indicator 44, the migration service 42 determines, based on the system stress indicator 44, whether the quantum service 32 is to be migrated (e.g., to the classical computing device 18). In some examples, the migration service 42 may determine whether the quantum service 32 is to be migrated by comparing the system stress indicator 44 to a predetermined threshold or parameter (not shown) that quantifies a condition that, when met, will trigger migration of the quantum service 32 by the migration service 42. For instance, a maximum temperature threshold may indicate an operating threshold for the quantum computing device 12, and the migration service 42, upon receiving a temperature reading provided by the system stress indicator 44, may determine that a current operating temperature of the quantum computing device 12 exceeds the maximum temperature threshold.

After determining that the quantum service 32 is to be migrated, the migration service 42 retrieves the QASM file 34 containing the quantum programming instructions 36(0)-36(P) that define the quantum service 32 (e.g., by accessing the QASM file 34 in the repository 38, as a non-limiting example). The migration service 42 then transmits the QASM file 34 to the quantum simulator 40 running on the classical computing device 18 for failover execution, as indicated by arrow 48. In some examples, the migration service 42 may also terminate the quantum service 32 (e.g., to conserve computing resources and/or quantum hardware). The termination of the quantum service 32, according to some examples, may be based on rules (not shown) that specify the conditions under which execution of the quantum service 32 should be ended.

In the example of FIG. 1, the quantum simulator 40 receives the QASM file 34 from the migration service 42, as indicated by the arrow 48. The quantum simulator 40 then executes a simulated quantum service 50 based on the QASM file 34. Because the simulated quantum service 50 uses the same QASM file 34 that defines the quantum service 32, the simulated quantum service 50 can provide functionality corresponding to the functionality of the quantum service 32, albeit at a reduced level of performance compared to the quantum service 32.

To allow clients (e.g., other services or computing devices not shown in FIG. 1) to access the functionality provided by the simulated quantum service 50 when the quantum service 32 is unavailable, or to restore access to the quantum service 32 after a period of unavailability, the computing system 10 in some examples includes the redirection computing device 24. The third processor device 28 of the redirection computing device 24 executes a redirection service 52 that can determine a status of the quantum service 32 and route client requests that are directed to the quantum service 32 to either the quantum service 32 or the simulated quantum service 50 depending on the status of the quantum service 32.

Thus, for example, the redirection service 52 may receive a client request 54 that is directed to the quantum service 32 (e.g., by specifying an address and/or other identifier of the quantum service 32). The redirection service 52 then may determine whether or not the quantum service 32 is operational on the quantum computing device 12. This determination may be based on a response (not shown) or lack thereof received from the quantum service 32 in response to a query from the redirection service 52, or the determination may be based on accessing a task manager (not shown) or other service that tracks the activity of the quantum service 32.

If the redirection service 52 determines that the quantum service 32 is not operational on the quantum computing device 12 (for example, because the quantum service 32 was terminated or because the quantum computing device 12 itself is unavailable), the redirection service 52 forwards the client request 54 to the simulated quantum service 50, as indicated by arrow 56. However, if the redirection service 52 determines that the quantum service 32 is operational, the redirection service 52 forwards the client request 54 to the quantum service 32, as indicated by arrow 58.

Figure 2:
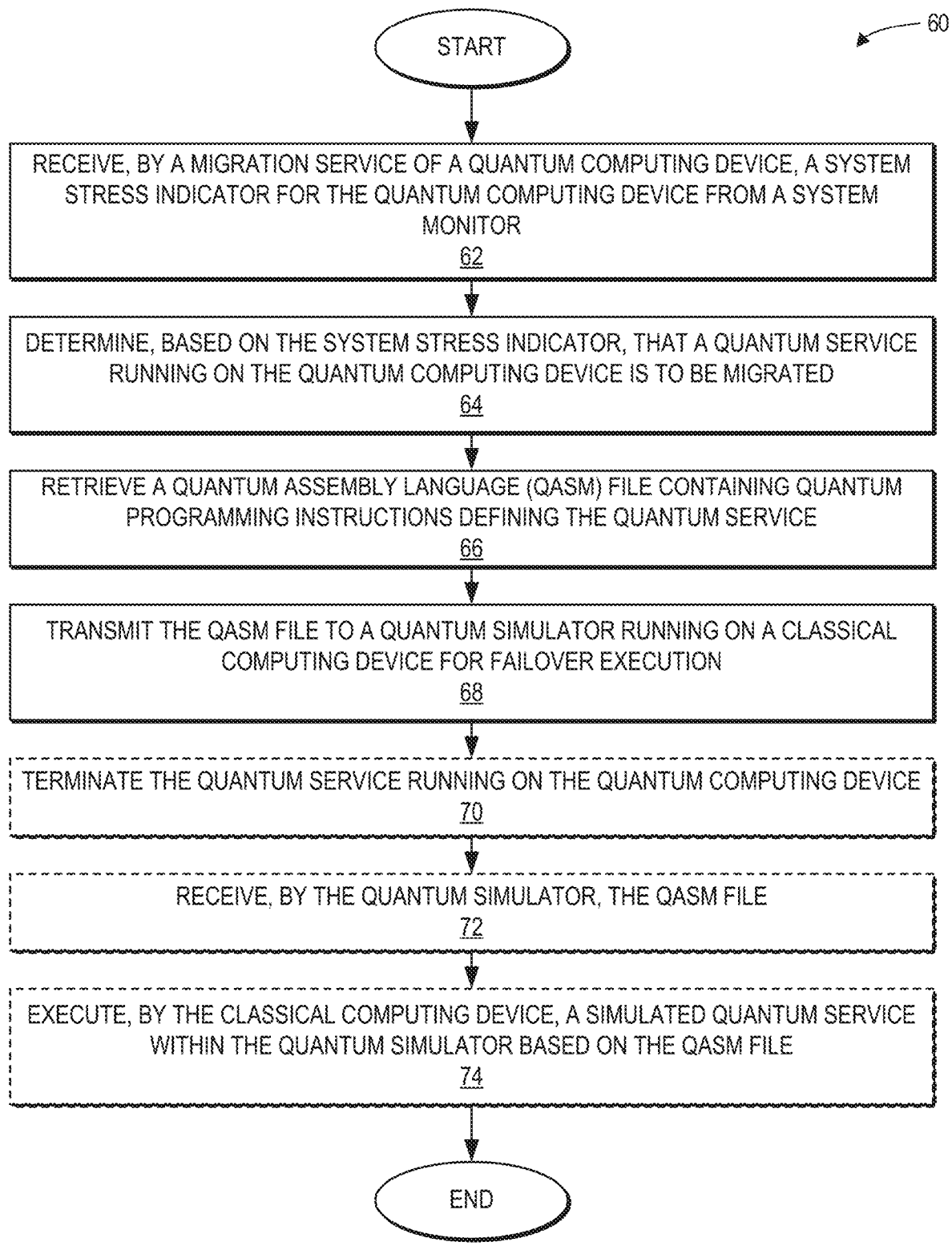
FIG. 2 is a flowchart illustrating exemplary operations for migrating quantum services from quantum computing devices to quantum simulators, according to one example.

To illustrate exemplary operations for migrating quantum services from quantum computing devices to quantum simulators, FIG. 2 provides a flowchart 60. Elements of FIG. 1 are referenced in describing FIG. 2 for the sake of clarity. In FIG. 2, operations begin with the first processor device 16 (e.g., by executing the migration service 42 of the quantum computing device 12) receiving the system stress indicator 44 for the quantum computing device 12 from the system monitor 46 (block 62). The migration service 42 determines, based on the system stress indicator 44, that the quantum service 32, running on the quantum computing device 12, is to be migrated (block 64). The migration service 42 retrieves the QASM file 34 containing the quantum programming instructions 36(0)-36(P) defining the quantum service 32 (block 66). The migration service 42 then transmits the QASM file 34 to the quantum simulator 40 running on the classical computing device 18 for failover execution (block 68). In some examples, the migration service 42 may also terminate the quantum service 32 running on the quantum computing device 12 (block 70).

Some examples may further provide that the quantum simulator 40 receives the QASM file 34 (block 72). The quantum simulator 40 then executes the simulated quantum service 50 within the quantum simulator 40 based on the QASM file 34 (block 74).

Figure 3:
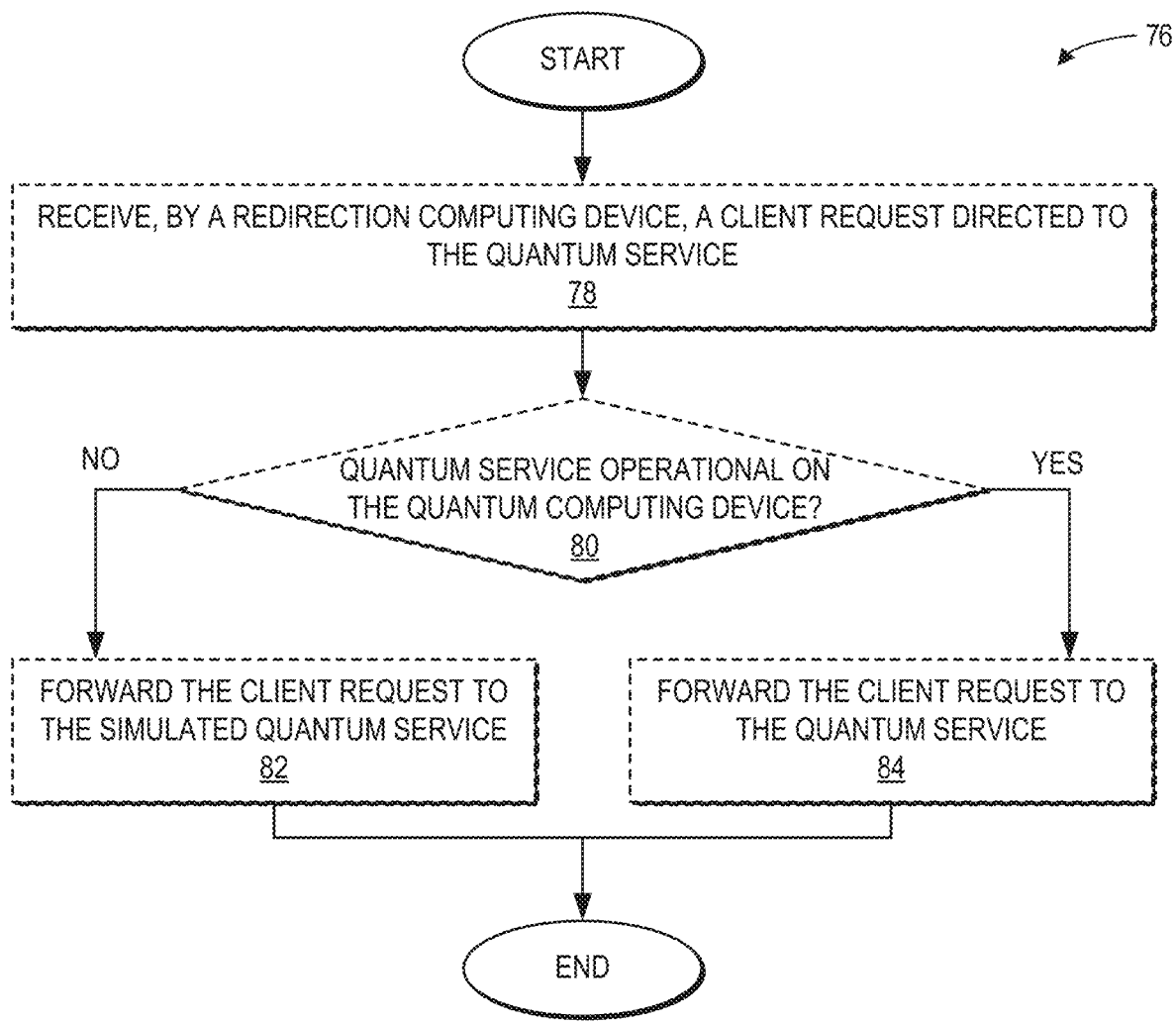
FIG. 3 is a flowchart illustrating exemplary operations performed by a redirection computing device for routing client requests directed to a quantum service, according to one example.

FIG. 3 provides a flowchart 76 showing exemplary operations performed by a redirection computing device such as the redirection computing device 24 of FIG. 1 for routing client requests directed to a quantum service such as the quantum service 32 of FIG. 1, according to one example. For the sake of clarity, elements of FIG. 1 are referenced in describing FIG. 3. Operations in FIG. 3 begin with the redirection computing device 24 receiving the client request 54 directed to the quantum service 32 (block 78). The redirection computing device 24 then determines whether the quantum service 32 is operational on the quantum computing device 12 (block 80).

If the redirection computing device 24 determines at decision block 80 that the quantum service 32 is not operational on the quantum computing device 12, the redirection computing device 24 forwards the client request to the simulated quantum service 50 (block 82). However, if the redirection computing device 24 determines at decision block 80 that the quantum service 32 is operational on the quantum computing device 12, the redirection computing device 24 forwards the client request to the quantum service 32 (block 84).

Figure 4:
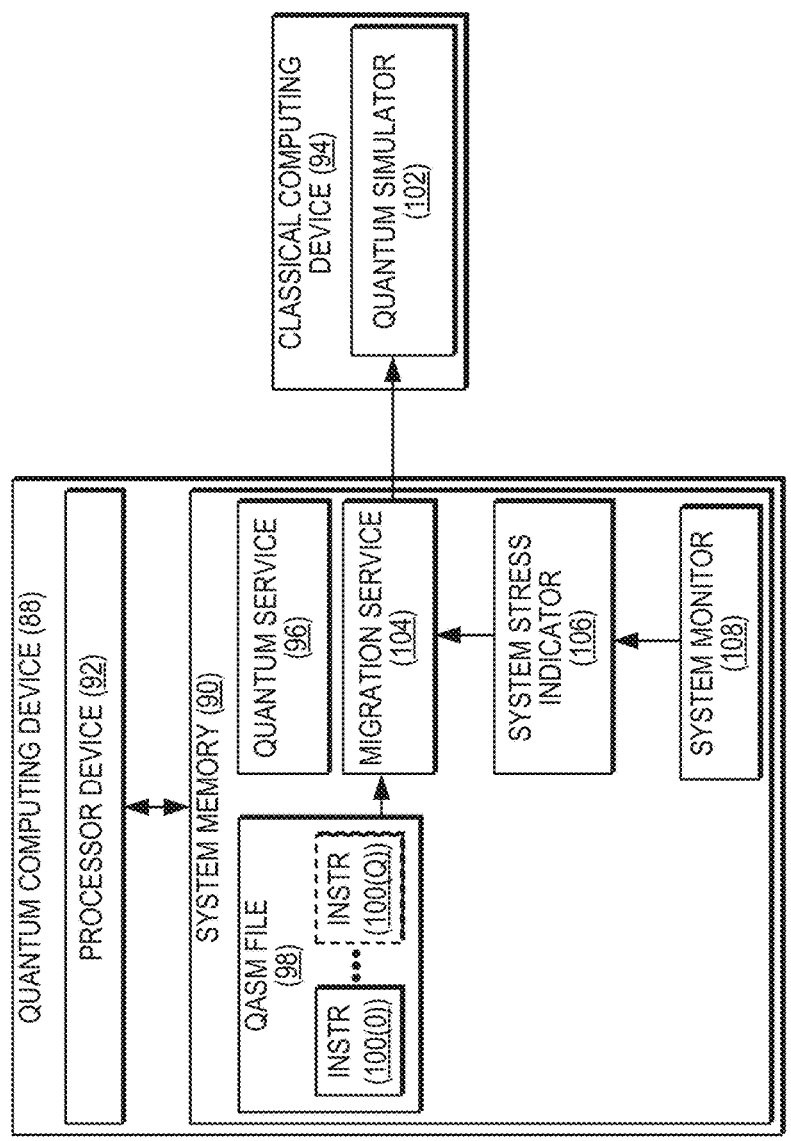
FIG. 4 is a simpler block diagram of the computing system of FIG. 1 for migrating quantum services from quantum computing devices to quantum simulators, according to one example.

FIG. 4 is a simpler block diagram of the computing system 10 of FIG. 1 for migrating quantum services from quantum computing devices to quantum simulators. In FIG. 4, a computing system 86 includes a quantum computing device 88 that comprises a system memory 90 and a processor device 92, and also includes a classical computing device 94. The quantum computing device 88 executes a quantum service 96, which is defined using a QASM file 98 that comprises one or more quantum programming instructions (captioned "INSTR" in FIG. 1) 100(0)-100(P). The classical computing device 94 executes a conventional quantum simulator 102, which is capable of taking as input a QASM file such as the QASM file 98, and simulating quantum operations or computation in a manner that may recreate the functionality of a quantum service such as the quantum service 96.

The quantum computing device 88 implements a migration service 104 that provides functionality for automatically migrating the quantum service 96. The migration service 104 is executed by the processor device 92 and receives a system stress indicator 106 from a system monitor 108 of the quantum computing device 88. Upon receiving the system stress indicator 106, the migration service 104 determines, based on the system stress indicator 106, that the quantum service 96 is to be migrated (e.g., to the classical computing device 94). The migration service 104 retrieves the QASM file 98 containing the quantum programming instructions 100(0)-100(P) that define the quantum service 96, and then transmits the QASM file 98 to the quantum simulator 102 running on the classical computing device 94 for failover execution.

Figure 5:
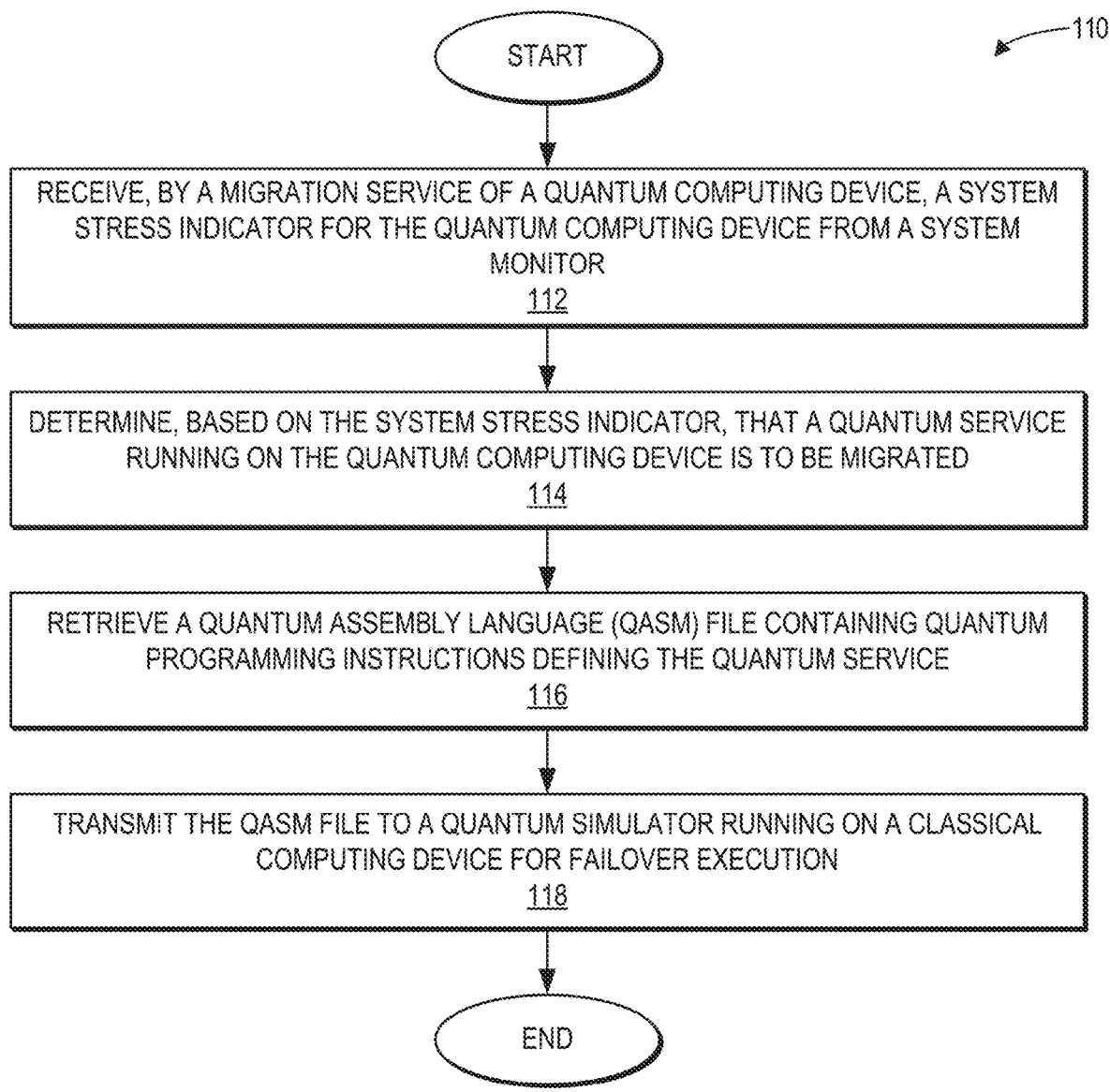
FIG. 5 is a flowchart of a simplified method for migrating quantum services from quantum computing devices to quantum simulators in the computing system of FIG. 4, according to one example.

FIG. 5 provides a flowchart 110 of a simplified method for migrating quantum services from quantum computing devices to quantum simulators in the computing system 86 of FIG. 4, according to one example. For the sake of clarity, elements of FIG. 4 are referenced in describing FIG. 5. In FIG. 5, operations begin with the processor device 92 (e.g., by executing the migration service 104 of the quantum computing device 88) receiving the system stress indicator 106 for the quantum computing device 88 from the system monitor 108 (block 112). The migration service 104 determines, based on the system stress indicator 44, that the quantum service 96 running on the quantum computing device 88 is to be migrated (block 114). The migration service 104 retrieves the QASM file 98 containing the quantum programming instructions 100(0)-100(P) defining the quantum service 96 (block 116). The migration service 104 then transmits the QASM file 98 to the quantum simulator 102 running on the classical computing device 94 for failover execution (block 118).

Figure 6:
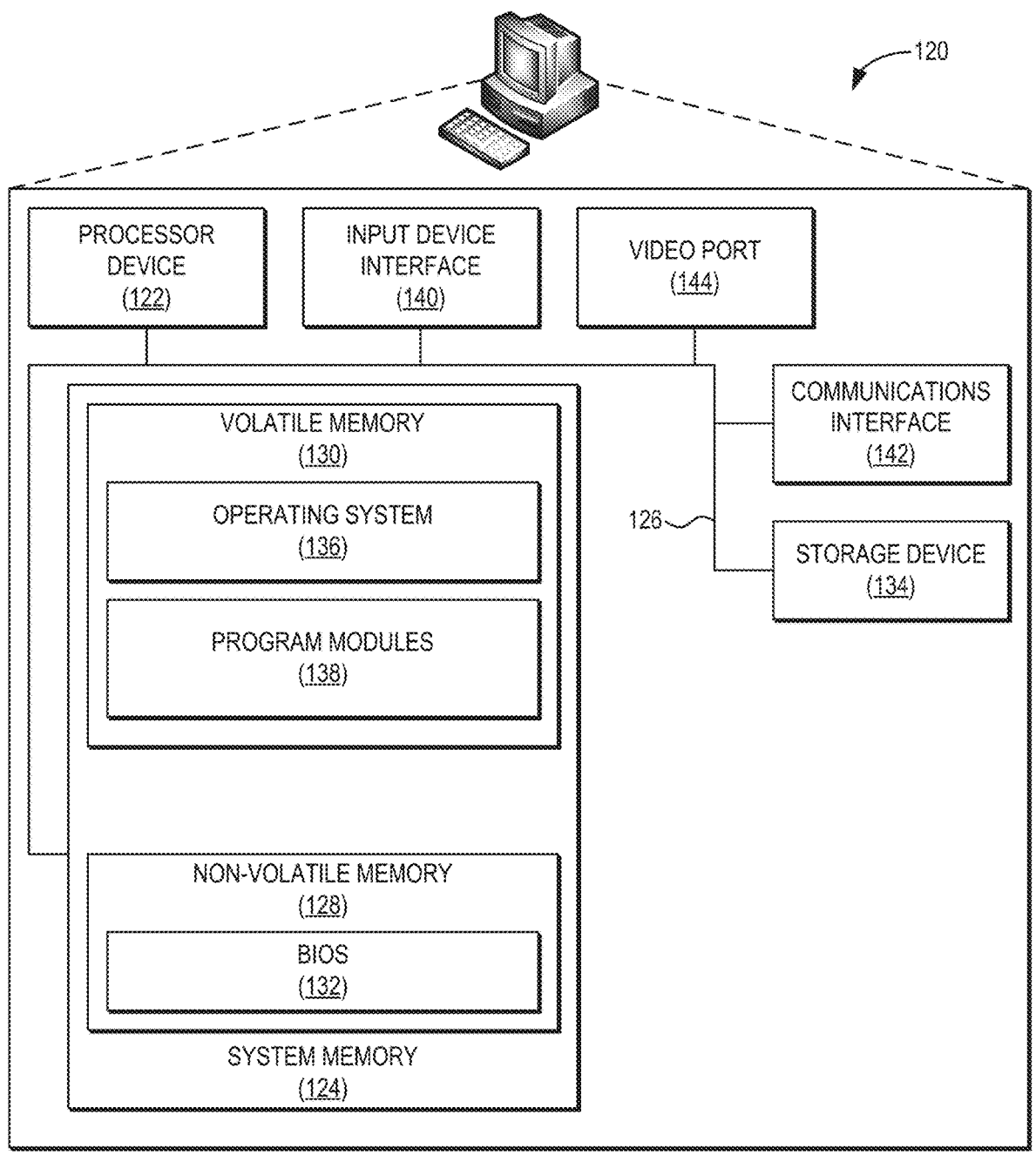
FIG. 6 is a block diagram of a classical computing device suitable for implementing examples, according to one example.

FIG. 6 is a block diagram of a processor-based computing device 120 ("computing device 120" or "classical computing device 120"), such as the classical computing device 18 of FIG. 1, suitable for implementing examples according to one example. The computing device 120 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 120 includes a processor device 122, a system memory 124, and a system bus 126. The system bus 126 provides an interface for system components including, but not limited to, the system memory 124 and the processor device 122. The processor device 122 can be any commercially available or proprietary processor.

The system bus 126 may be any of several types of bus structures that may further interconnect to a memory bus (with or without a memory controller), a peripheral bus, and/or a local bus using any of a variety of commercially available bus architectures. The system memory 124 may include non-volatile memory 128 (e.g., read-only memory (ROM), erasable programmable ROM (EPROM), electrically EPROM (EEPROM), etc.), and volatile memory 130 (e.g., RAM). A basic input/output system (BIOS) 132 may be stored in the non-volatile memory 128 and can include the basic routines that help to transfer information among elements within the computing device 120. The volatile memory 130 may also include a high-speed RAM, such as static RAM, for caching data.

The computing device 120 may further include or be coupled to a non-transitory computer-readable storage medium such as a storage device 134, which may comprise, for example, an internal or external hard disk drive (HDD) (e.g., enhanced integrated drive electronics (EIDE) or serial advanced technology attachment (SATA)), for storage, flash memory, or the like. The storage device 134 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 134 and in the volatile memory 130, including an operating system 136 and one or more program modules 138 which may implement the functionality described herein in whole or in part. It is to be appreciated that the examples can be implemented with various commercially available operating systems 136 or combinations of operating systems 136. All or a portion of the examples may be implemented as a computer program product stored on a transitory or non-transitory computer-usable or computer-readable storage medium, such as the storage device 134, which includes complex programming instructions, such as complex computer-readable program code, to cause the processor device 122 to carry out the steps described herein. Thus, the computer-readable program code can comprise software instructions for implementing the functionality of the examples described herein when executed on the processor device 122. The processor device 122 may serve as a controller, or control system, for the computing device 120 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 122 through an input device interface 140 that is coupled to the system bus 126 but can be connected by other interfaces, such as a parallel port, an Institute of Electrical and Electronic Engineers (IEEE) 1394 serial port, a Universal Serial Bus (USB) port, an IR interface, and the like.

The computing device 120 may also include a communications interface 142 suitable for communicating with a network as appropriate or desired. The computing device 120 may also include a video port 144 to interface with a display device to provide information to a user.

Figure 7:
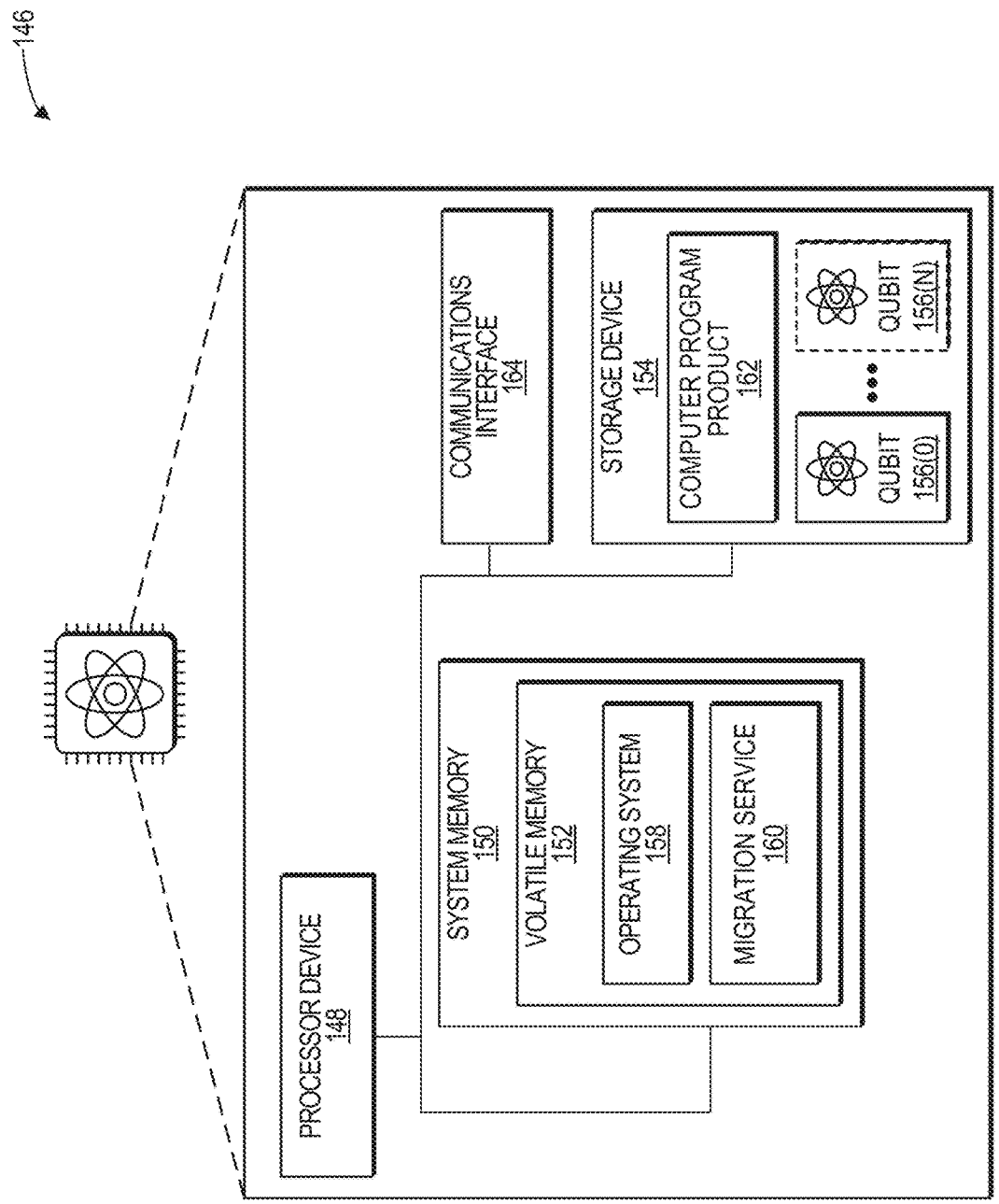
FIG. 7 is a block diagram of a quantum computing device suitable for implementing examples, according to one example.

FIG. 7 is a block diagram of a quantum computing device 146, such as the quantum computing device 12 of FIG. 1, suitable for implementing examples according to one example. The quantum computing device 146 may comprise any suitable quantum computing device or devices. The quantum computing device 146 can operate using classical computing principles or quantum computing principles. When using quantum computing principles, the quantum computing device 146 performs computations that utilize quantum-mechanical phenomena, such as superposition and entanglement. The quantum computing device 146 may operate under certain environmental conditions, such as at or near zero degrees (0°) Kelvin. When using classical computing principles, the quantum computing device 146 utilizes binary digits that have a value of either zero (0) or one (1).

The quantum computing device 146 includes a processor device 148 and a system memory 150. The processor device 148 can be any commercially available or proprietary processor suitable for operating in a quantum environment. The system memory 150 may include volatile memory 152 (e.g., RAM). The quantum computing device 146 may further include or be coupled to a non-transitory computer-readable medium such as a storage device 154, which may comprise, for example, an internal or external HDD (e.g., EIDE or SATA), for storage, flash memory, or the like. The storage device 154 and other drives associated with computer-readable media and computer-usable media may provide non-volatile storage of data, data structures, computer-executable instructions, and the like. The storage device may also provide functionality for storing one or more qubits 156(0)-156(N).

A number of modules can be stored in the storage device 154 and in the volatile memory 152, including an operating system 158 and one or more modules, such as a migration service 160. All or a portion of the examples may be implemented as a computer program product 162 stored on a transitory or non-transitory computer-usable or computer-readable medium, such as the storage device 154, which includes computer-executable instructions, such as complex computer-readable program code, to cause the processor device 148 to carry out the steps described herein. Thus, the computer-readable program code can comprise software instructions for implementing the functionality of the examples described herein when executed on the processor device 148. An operator may also be able to enter one or more configuration commands through a keyboard (not illustrated), a pointing device such as a mouse (not illustrated), or a touch-sensitive surface such as a display device. The quantum computing device 146 may also include a communications interface 164 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a migration service of a quantum computing device, a system stress indicator for the quantum computing device from a system monitor;
   determining, based on the system stress indicator, that a quantum service running on the quantum computing device is to be migrated;
   retrieving a Quantum Assembly Language (QASM) file containing quantum programming instructions defining the quantum service; and
   transmitting the QASM file to a quantum simulator running on a classical computing device for failover execution.

2. The method of claim 1, wherein the system stress indicator comprises one or more of an indication of a state of the quantum computing device and an indication of a state of one or more qubits of the quantum service.

3. The method of claim 2, wherein:
   the indication of the state of the quantum computing device comprises one or more of an indication of system load, an indication of system response time, and an indication of operating temperature; and
   the indication of the state of the one or more qubits of the quantum service comprises one or more of an indication of qubit age and an indication of coherence time.

4. The method of claim 1, wherein the quantum simulator comprises an instance of a Qiskit quantum computing framework.

5. The method of claim 1, further comprising terminating the quantum service running on the quantum computing device.

6. The method of claim 1, further comprising:
   receiving, by the quantum simulator, the QASM file; and
   executing, by the classical computing device, a simulated quantum service within the quantum simulator based on the QASM file.

7. The method of claim 6, further comprising:
receiving, by a redirection computing device, a first client request directed to the quantum service;
determining that the quantum service is not operational on the quantum computing device; and
forwarding the first client request to the simulated quantum service.

8. The method of claim 7, further comprising:
receiving, by the redirection computing device, a second client request directed to the quantum service;
determining that the quantum service is operational on the quantum computing device; and
forwarding the second client request to the quantum service.

9. A computing system, comprising:
a quantum computing device, comprising:
a first system memory; and
a first processor device coupled to the first system memory, the first processor device to:
receive, using a migration service, a system stress indicator for the quantum computing device from a system monitor;
determine, based on the system stress indicator, that a quantum service running on the quantum computing device is to be migrated;
retrieve a Quantum Assembly Language (QASM) file containing quantum programming instructions defining the quantum service; and
transmit the QASM file to a quantum simulator running on a classical computing device for failover execution.

10. The computing system of claim 9, wherein the system stress indicator comprises one or more of an indication of a state of the quantum computing device and an indication of a state of one or more qubits of the quantum service.

11. The computing system of claim 10, wherein:
the indication of the state of the quantum computing device comprises one or more of an indication of system load, an indication of system response time, and an indication of operating temperature; and
the indication of the state of the one or more qubits of the quantum service comprises one or more of an indication of qubit age and an indication of coherence time.

12. The computing system of claim 9, wherein the quantum simulator comprises an instance of a Qiskit quantum computing framework.

13. The computing system of claim 9, wherein the first processor device is further to terminate the quantum service running on the quantum computing device.

14. The computing system of claim 9, wherein the classical computing device comprises:
a second system memory; and
a second processor device coupled to the second system memory, the second processor device to:
receive, by the quantum simulator, the QASM file; and
execute a simulated quantum service within the quantum simulator based on the QASM file.

15. The computing system of claim 14, further comprising:
a redirection computing device, comprising:
a third system memory; and
a third processor device coupled to the third system memory, the third processor device to:
receive a first client request directed to the quantum service;
determine that the quantum service is not operational on the quantum computing device; and
forward the first client request to the simulated quantum service.

16. The computing system of claim 15, wherein the third processor device is further to:
receive a second client request directed to the quantum service;
determine that the quantum service is operational on the quantum computing device; and
forward the second client request to the quantum service.

17. A non-transitory computer-readable storage medium having stored thereon computer-executable instructions that, when executed, cause one or more processor devices to:
receive a system stress indicator for a quantum computing device from a system monitor;
determine, based on the system stress indicator, that a quantum service running on the quantum computing device is to be migrated;
retrieve a Quantum Assembly Language (QASM) file containing quantum programming instructions defining the quantum service; and
transmit the QASM file to a quantum simulator running on a classical computing device for failover execution.

18. The non-transitory computer-readable medium of claim 17, wherein the computer-executable instructions further cause the one or more processor devices to execute a simulated quantum service within the quantum simulator based on the QASM file.

19. The non-transitory computer-readable medium of claim 18, wherein the computer-executable instructions further cause the one or more processor devices to:
receive a first client request directed to the quantum service;
determine that the quantum service is not operational on the quantum computing device; and
forward the first client request to the simulated quantum service.

20. The non-transitory computer-readable medium of claim 19, wherein the computer-executable instructions further cause the one or more processor devices to:
receive a second client request directed to the quantum service;
determine that the quantum service is operational on the quantum computing device; and
forward the second client request to the quantum service.

* * * * *